United States Patent

Koukal et al.

[11] Patent Number: 5,230,547
[45] Date of Patent: Jul. 27, 1993

[54] RUN-OFF COLLECTING BOX

[75] Inventors: Heinz Koukal, Sindelfingen; Matthias Ehm, Weil der Stadt; Marcel Costoiu, Rutesheim; Martin Pfeiffer, Stuttgart, all of Fed. Rep. of Germany

[73] Assignee: Mercedes-Benz AG, Fed. Rep. of Germany

[21] Appl. No.: 789,843

[22] Filed: Nov. 8, 1991

[30] Foreign Application Priority Data

Nov. 10, 1990 [DE] Fed. Rep. of Germany ....... 4035808

[51] Int. Cl.⁵ .............................................. B62D 25/08
[52] U.S. Cl. ................................... 296/192; 296/208; 454/147; 454/158
[58] Field of Search .................... 296/96.15, 192, 208; 248/48.1, 48.2; 454/147, 158; 52/11

[56] References Cited

U.S. PATENT DOCUMENTS

| 1,632,036 | 6/1927 | Mullen | 248/48.1 |
| 2,747,920 | 5/1956 | Ulrich | 296/192 X |
| 3,057,117 | 10/1962 | Singer | 248/48.1 |
| 4,355,843 | 10/1982 | Murakami | 296/201 |
| 4,591,202 | 5/1986 | Burk et al. | 296/192 X |
| 4,597,323 | 7/1986 | Mordau et al. | 454/158 X |
| 4,912,888 | 4/1990 | Martin | 52/11 X |
| 4,988,144 | 1/1991 | Johnson et al. | 296/192 |
| 5,056,423 | 10/1991 | Koukal et al. | 454/147 |

FOREIGN PATENT DOCUMENTS

| 3402744 | 6/1985 | Fed. Rep. of Germany . |
| 2623455 | 5/1989 | France | 296/192 |

Primary Examiner—Dennis H. Pedder
Attorney, Agent, or Firm—Evenson, McKeown, Edwards & Lenahan

[57] ABSTRACT

A water box is provided for collecting run-off water which flows between a motor vehicle windscreen and an engine bonnet into a body space. A component has a water guide channel which carries away water along the windscreen lower edge, a forward set water box, under which is located a filter element, connecting with at least the central section of the component. The water box has an attachment section to the component with the water guide channel and may be moved in this attachment section from its connected position on the component so that it frees a path for exchanging the filter element.

3 Claims, 2 Drawing Sheets

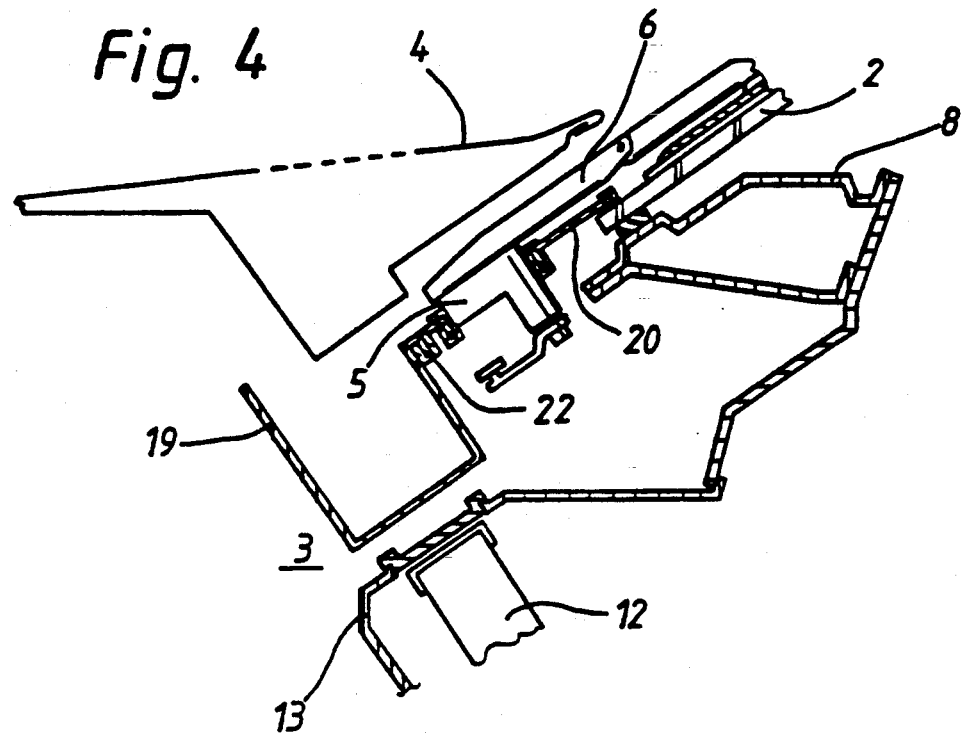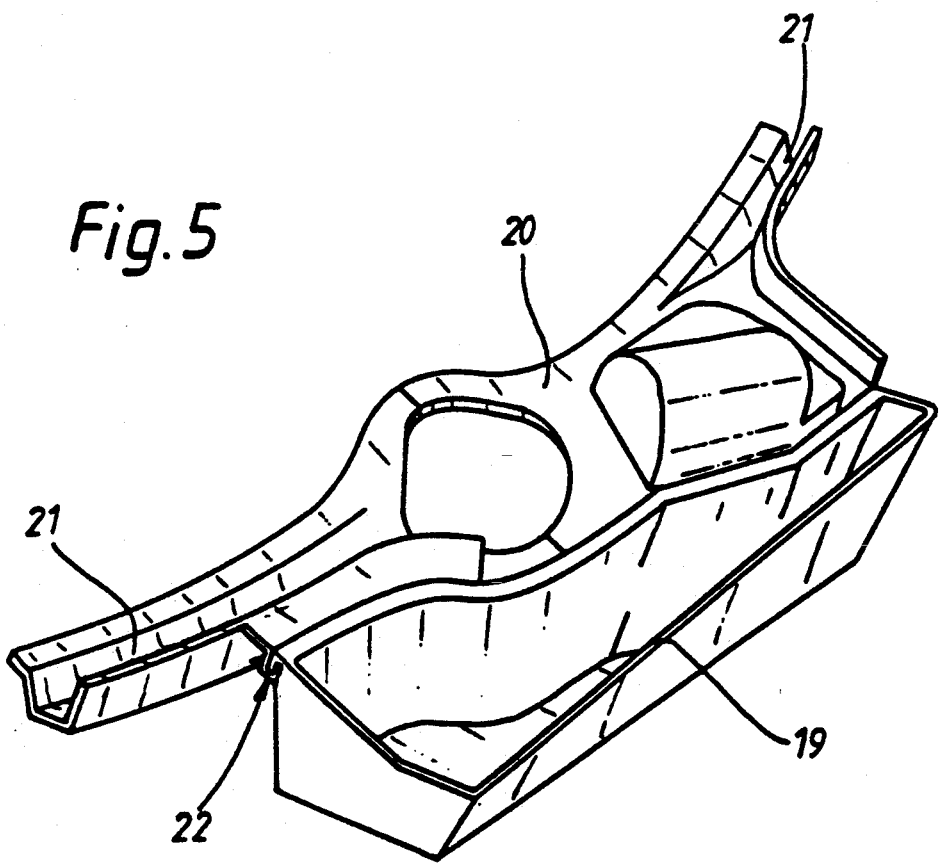

ns and advantages of 45
RUN-OFF COLLECTING BOX

BACKGROUND AND SUMMARY OF THE INVENTION

The invention concerns a water box for collecting run-off water, and, more particularly, to a water box which is provided with a water guide channel which carries water away along a windscreen lower edge and under which is located a removable filter element.

A motor vehicle is shown in DE-PS 34 02 744, in which a water box is inserted under a gap between a rear end of an engine bonnet and a windscreen. At least one water channel leading to one vehicle side is integrally connected to the water box. There is, among other things, a filter element under this water box. A filter element can become ineffective or its operation may be impaired due to dirt and it must then be exchanged. For this purpose, the securely seated water box, which extends over a large area along the windscreen, has to be released from its retention features and removed, together with the water channel, from the engine compartment. It is possible that other components or units are in the way and these must also be removed.

An object of the present invention is to provide a water box, by means of which a filter element underneath can be exchanged rapidly and without expense.

This object has been achieved in accordance with the present invention by providing the water box with an attachment section so as to be movable from a connected position to free a path for exchanging the filter element.

A connecting section between the water box and the component with the water guide channel permits movement of the water box relative to this component. As a result, the water box frees the path for exchanging the filter element and decisively facilitates this procedure. If the water box is clipped onto the component or is attached to the latter by a film hinge, no special tools are necessary for removing the water box from its connected position.

BRIEF DESCRIPTION OF THE DRAWINGS

These and other features, objects and advantages of the present invention will become more apparent from the following detailed description of currently preferred embodiments when taken in conjunction with the accompanying drawings wherein:

FIG. 4 is a side cross-sectional view through a water box clipped onto a component which also covers a windscreen wiper motor; and FIG. 5 is a perspective view onto the water box and the component shown in FIG. 4.

DETAILED DESCRIPTION OF THE DRAWINGS

Figure 1:
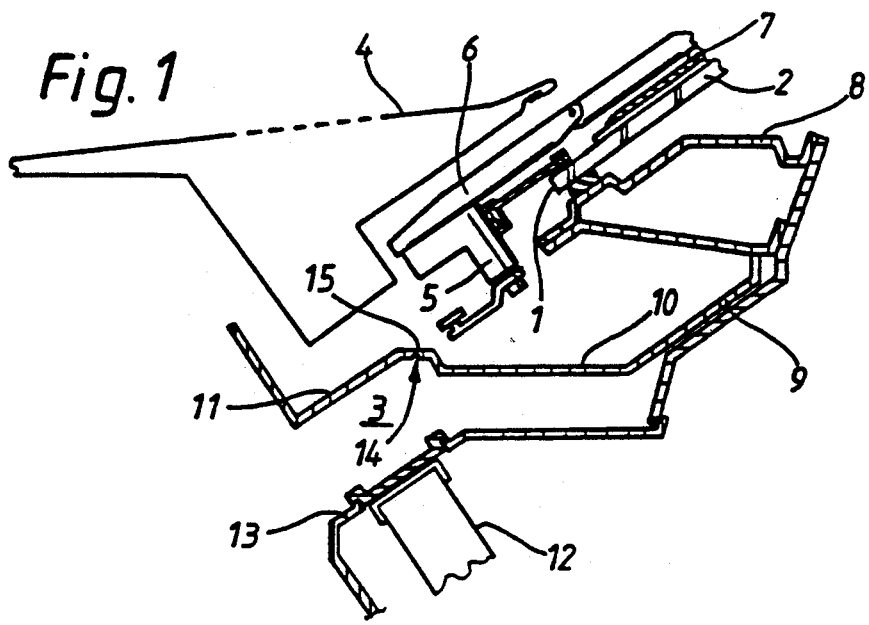
FIG. 1 is a side cross-sectional view in the connected position, of one embodiment of a water box which can be pivoted up in accordance with the present invention.

A cross-section of a motor vehicle in the region of a lower edge 1 of a windscreen 2 is shown in FIG. 1. Between the windscreen 2 and an engine bonnet 4 covering an engine compartment 3, there is a wiper drive 5 of a windscreen wiper 6 whose wiper rubber 7 wipes over the windscreen 2 fixed to a body member 8 and, by this means, removes water to the windscreen lower edge 1. In the engine compartment 3, there is a component 9 with a water guide channel 10 through which the water is carried away along the windscreen lower edge 1 into a water box 11. The water box 11 is set forward in the central section of the component 9.

Figure 2:
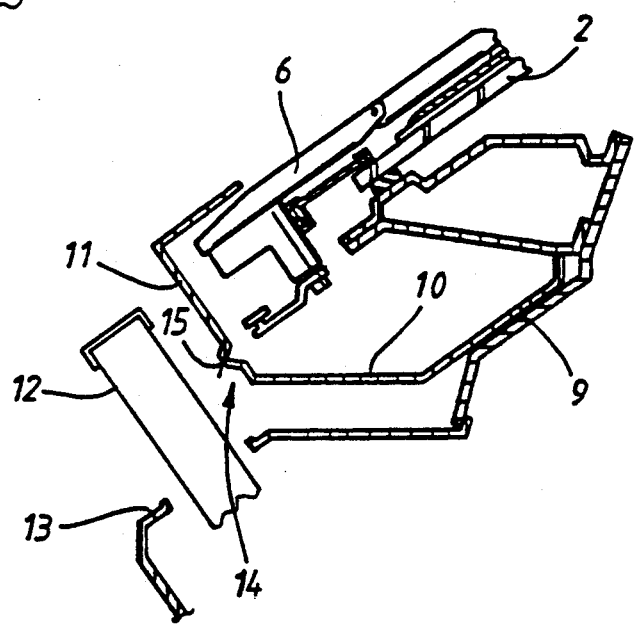
FIG. 2 is a view similar to FIG. 1 but showing the water box in the pivoted-up position.
Figure 3:
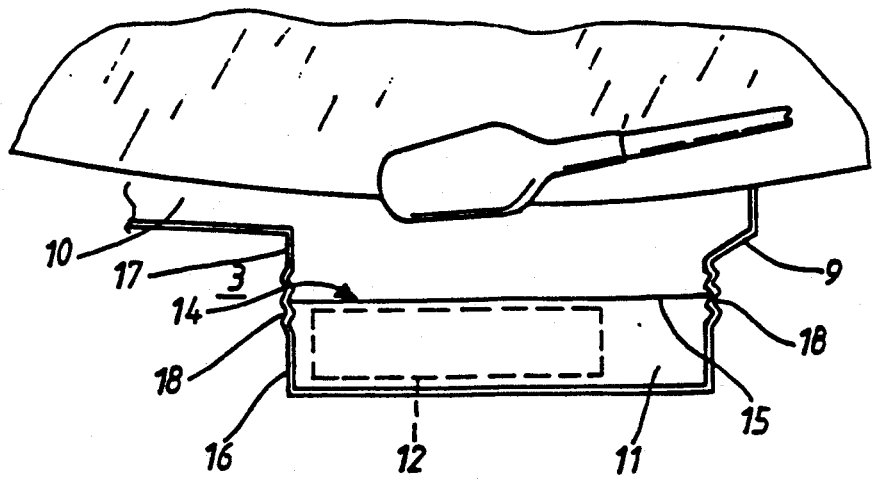
FIG. 3 is a plan view onto a water box which can be pivoted up as shown in FIGS. 1 and 2, and which is attached at the side by bellows.

Because the water box 11 covers a relatively large area of the engine compartment 3, as may be more clearly seen in FIG. 3, in order to prevent the penetration of water, a filter element 12 used for cleaning the fan air comes to be located under the water box 11. The filter element 12 has to be maintained at regular intervals for this purpose, the element 12 must be removed from its receptacle 13 in the engine compartment 3. For this purpose, the water box 11 has an attachment section 14 attaching it to the component 9 with the water guide channel 10. This attachment section 14 permits the water box 11 to be moved from its connected position on the component 9, thereby freeing the path for exchanging the filter element 12. In this embodiment, the water box 11 is fixed to the component 9 by a film hinge 15 and can be pivoted up on the component 9, as is shown in FIG. 2.

FIG. 3 also shows that a bellows 18 can be provided between each of the side walls 16 of the water box 11 and the connected walls 17 of the component 9. This bellows 18 connects the two walls 16 and 17 so that they can move relative to one another but so that no water can emerge.

FIGS. 4 and 5 show another embodiment of a water box 19 attached to a component 20. This component 20, with water guide channels 21 on both sides, surrounds the upper part of the wiper drive 5, thereby protecting the wiper drive 5 against water. The water flowing off the windscreen 2 runs into the water guide channels 21 and/or directly into the water box 19. The water box 19, which again covers a filter element 12 in the engine compartment 3, is clipped to the component 20 in an attachment section 22 along one component edge. When it is necessary to exchange the filter element 12, the water box 19 can be unclipped, without an auxiliary tool, from the component 20 with the water guide channels 21 and frees the path for the filter element 12.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for collecting run-off water which flows between a vehicle windscreen and an engine bonnet of a vehicle into a body space of the vehicle, comprising a component with a water guide channel which carries water away along a windscreen lower edge, a water box located forwardly of the component as viewed in a longitudinal direction of the vehicle and connecting at a rearward attachment section thereof with at least the central section of the component, and a filter element located below the water box wherein the water box has a forward portion selectively movable relative to a position on the component to provide access for exchanging the filter element located thereinbelow wherein the attachment section includes a film hinge provided between the water box and the component, the film hinge allowing at least a portion of the water box to be pivoted with respect to the component.

2. A device for collecting run-off water which flows between a vehicle windscreen and an engine bonnet of a vehicle into a body space of the vehicle, comprising a component with a water guide channel which carries water away along a windscreen lower edge, a water box located forwardly of the component as viewed in a longitudinal direction of the vehicle and connecting at a rearward attachment section thereof with at least the central section of the component, and a filter element located below the water box wherein the water box has a forward portion selectively movable relative to a position on the component to provide access for exchanging the filter element located thereinbelow wherein the attachment section is configured so that at least a portion of the water box can be pivoted up on the component and wherein side walls of the water box are connected to walls of the component and are attached thereto by bellows.

3. The device according to claim 1, wherein side walls of the water box are connected to walls of the component and are attached thereto by bellows.

* * * * *